United States Patent
Song

(10) Patent No.: US 9,282,220 B2
(45) Date of Patent: Mar. 8, 2016

(54) IMAGE SCANNING APPARATUS AND METHOD FOR CORRECTING VERTICAL STREAK THEREOF

(71) Applicant: SAMSUNG ELECTRONICS CO., LTD., Suwon-si, Gyeonggi-do (KR)

(72) Inventor: Su-han Song, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/273,087

(22) Filed: May 8, 2014

(65) Prior Publication Data

US 2015/0022864 A1 Jan. 22, 2015

(30) Foreign Application Priority Data

Jul. 17, 2013 (KR) .......................... 10-2013-0084299

(51) Int. Cl.
 *H04N 1/409* (2006.01)
 *H04N 1/58* (2006.01)
 *G06T 7/00* (2006.01)

(52) U.S. Cl.
 CPC ............... *H04N 1/58* (2013.01); *G06T 7/0002* (2013.01); *H04N 1/4097* (2013.01)

(58) Field of Classification Search
 None
 See application file for complete search history.

(56) References Cited

U.S. PATENT DOCUMENTS

| | | | |
|---|---|---|---|
| 6,393,161 B1 | 5/2002 | Stevenson et al. | |
| 7,058,236 B2 | 6/2006 | Ohashi | |
| 7,119,926 B2 | 10/2006 | Takeda et al. | |
| 7,388,989 B2 | 6/2008 | Wang | |
| 7,433,539 B2 | 10/2008 | Wang et al. | |
| 7,515,298 B2 | 4/2009 | Suzuki et al. | |
| 7,551,326 B2 | 6/2009 | Saka et al. | |
| 7,719,731 B2 * | 5/2010 | Saka et al. | 358/530 |
| 7,782,503 B2 | 8/2010 | Ishido et al. | |
| 7,813,005 B2 | 10/2010 | Arai | |
| 7,839,545 B2 * | 11/2010 | Saka et al. | 358/3.26 |
| 8,203,761 B2 * | 6/2012 | Arima | 358/3.26 |
| 8,391,585 B2 * | 3/2013 | Kuchii | 382/141 |
| 8,861,054 B2 * | 10/2014 | Iwayama et al. | 358/538 |
| 2009/0244657 A1 * | 10/2009 | Arima | 358/483 |
| 2010/0067061 A1 | 3/2010 | Hayashi | |
| 2011/0242628 A1 * | 10/2011 | Morikawa | 358/504 |

FOREIGN PATENT DOCUMENTS

| | | |
|---|---|---|
| JP | 10-164367 | 6/1998 |
| JP | 3684038 | 8/2005 |

* cited by examiner

*Primary Examiner* — Scott A Rogers
(74) *Attorney, Agent, or Firm* — Staas & Halsey LLP

(57) ABSTRACT

An image scanning apparatus includes a scanner which scans a document and generates a scan image, a sensor which senses vertical streaks, a detector which detects a contents area on the scan image, and a corrector which corrects the vertical streaks on the scan image while protecting the contents area. The sensor may sense pole points in a main scan direction on the scan image, sense vertical streak suspected pixels based on a brightness difference and/or a color difference between the sensed pole points and surrounding pixels of the pole points, and may further sense vertical streaks based on the consecutiveness of the vertical streak suspected pixels toward a sub scan direction.

23 Claims, 24 Drawing Sheets

IMAGE SCANNING APPARATUS AND METHOD FOR CORRECTING VERTICAL STREAK THEREOF

CROSS-REFERENCE TO RELATED APPLICATIONS

This application claims priority from Korean Patent Application No. 10-2013-0084299, filed on Jul. 17, 2013 in the Korean Intellectual Property Office, the disclosure of which is incorporated herein by reference in its entirety.

BACKGROUND

1. Field

Devices and methods with respect to the example embodiments disclosed herein relate to an image scanning apparatus and a method for correcting a vertical streak thereof, and more specifically, to an image scanning apparatus which precisely senses and corrects vertical streaks generated due to exterior materials on scan images and a method to correct vertical streaks thereof.

2. Description of the Related Art

An image scanning apparatus generally refers to a device which scans a document and creates a scan image while including an auto document feeder for automatically feeding documents.

A document provided by the auto document feeder passes through a scanner including a flat glass in order to be scanned. During this process, image quality may deteriorate according to the surface condition of the flat glass. Specifically, if exterior materials, e.g., dust generated from the document are adsorbed onto the flat glass, a black or white vertical streak may be included in a scan image. Such phenomenon may frequently occur in an environment which causes a large amount of static electrical charges such as a low-temperature environment or a dry environment.

Meanwhile, the above described phenomenon may be handled with a method for deleting or removing dusts adsorbed onto the flat glass. However, users who are not aware of this method cannot handle the phenomenon and may experience the inconvenience of the vertical streak appearing in the scanned image. Further, even users who are aware of this method may not recognize that dust is adsorbed onto the flat glass directly, and may suffer the inconvenience of the vertical streaks appearing in the scanned image because they fail to remove the dust whenever documents are scanned.

SUMMARY

Additional aspects and/or advantages will be set forth in part in the description which follows and, in part, will be apparent from the description, or may be learned by practice of the invention.

Exemplary embodiments of the present inventive concept overcome the above disadvantages and other disadvantages not described above. However, the present inventive concept is not required to overcome the disadvantages described above, and an exemplary embodiment of the present inventive concept may not overcome any of the problems described above.

According to an embodiment, an image scanning apparatus precisely senses and corrects vertical streaks which may be generated due to exterior materials on scan images and a method which corrects the vertical streaks.

Further, example embodiments disclosed herein are related to an image scanning apparatus which may instantly recognize vertical streaks, if a position of a vertical streak suspected pixel changes according to movement of exterior materials while a document is scanned, and a method which corrects the vertical streaks.

Further, example embodiments disclosed herein are related to an image scanning apparatus which may provide an alarm message regarding the vertical streak, if a vertical streak is positioned on a plurality of pages constituting scan images, and a method which corrects vertical streaks.

According to an embodiment, an image scanning apparatus is provided, which may include a scanner, a sensor, a detector, and a corrector. The scanner may be configured to (or adapted to, capable of, operable to, suitable for, etc.) scan a document and generate a scan image. The sensor may be configured to (or adapted to, capable of, operable to, suitable for, etc.) sense pole points on the scan image toward (or in) a main scan direction, sense vertical streak suspected pixels based on at least one of a brightness difference and a color difference between the sensed pole points and their surrounding pixels, and sense vertical streaks based on a consecutiveness of the vertical streak suspected pixels toward (or in) a sub scan direction. The detector may be configured to (or adapted to, capable of, operable to, suitable for, etc.) detect a contents area on the scan image, and the corrector may be configured to (or adapted to, capable of, operable to, suitable for, etc.) protect the detected contents area and correct the sensed vertical streaks on the scan image.

The sensor may include a pole point sensor configured to (or adapted to, capable of, operable to, suitable for, etc.) sense pole points from the pixels placed on a main scan direction on the scan image. The sensor may further include a first sensor configured to (or adapted to, capable of, operable to, suitable for, etc.) calculate a brightness difference between the sensed pole points and surrounding pixels of the pole points, and sense the sensed pole points to be first vertical streak suspected pixels when the calculated brightness difference is within a predetermined critical range. The sensor may further include a second sensor configured to (or adapted to, capable of, operable to, suitable for, etc.) calculate a first brightness difference between the first vertical streak suspected pixels and at least two surrounding pixels placed near on a left side of the first vertical streak suspected pixels and a second brightness difference between the first vertical streak suspected pixels and at least two surrounding pixels placed near on a right side of the first vertical streak suspected pixels, and sense the first vertical streak suspected pixels to be second vertical streak suspected pixels when the first brightness difference and the second brightness difference are less than a predetermined critical value. The sensor may further include a third sensor configured to (or adapted to, capable of, operable to, suitable for, etc.) sense the second vertical streak suspected pixels to be third vertical streak suspected pixels based on color inclusion and a color ratio between the second vertical streak suspected pixels and the surrounding pixels of the second vertical streak suspected pixels.

The third sensor may sense the second vertical streak suspected pixels to be third vertical streak suspected pixels when all of the second vertical streak suspected pixels and the surrounding pixels have color information, and may confirm the color ratio between the second vertical streak suspected pixels and the surrounding pixels when color information is generated on the second vertical streak suspected pixels while color information is not generated on the surrounding pixels, and may sense the second vertical streak suspected pixels to be third vertical streak suspected pixels when the color ratio is less than a predetermined critical value.

The sensor may additionally include a vertical streak sensor configured to (or adapted to, capable of, operable to, suitable for, etc.) confirm whether the third vertical streak suspected pixels have consecutiveness toward (or in) a sub scan direction on the scan image, and sense the third vertical streak suspected pixels to be vertical streaks when at least one of length and frequency regarding the consecutiveness is equal to, or greater than a predetermined critical value.

The first sensor may determine the sensed pole points as corresponding to noise pixels when the calculated first brightness difference is less than a minimum critical value in the predetermined critical range. The vertical streak sensor may sense the third vertical streak suspected pixels as noise pixels when the length and frequency regarding the consecutiveness is less than the third predetermined critical value.

The detector may detect the contents area on the generated scan image by using the sensing results of one or more or all of the first to the third sensors.

The detector may detect the sensed pole points to be a contents area when the calculated brightness difference is greater than a maximum critical value in the predetermined critical range based upon a sensing result of the first sensor, may detect the first vertical streak suspected pixels to be a contents area when the calculated first brightness difference and the second brightness difference are greater than a predetermined critical value based upon a sensing result of the second sensor, and may detect the second vertical streak suspected pixels to be a contents area when the color ratio is greater than a predetermined critical value after confirming the color ratio between the second vertical streak suspected pixels and the surrounding pixels based upon a sensing result of the third sensor.

When there are overlapping areas confirmed by confirming positions of the vertical streaks sensed in the sensor and positions of the contents area detected by the detector, the corrector may correct the vertical streaks by decreasing an intensity of correction regarding the overlapping areas.

When there are overlapping areas confirmed by confirming positions of the vertical streaks sensed in the sensor and positions of the contents area detected by the detector, the corrector may correct the vertical streaks by excluding the overlapping areas from correction.

The sensor may divide the scan image into a plurality of bands and sense the vertical streak suspected pixels per each band.

When there is change in a position of a vertical streak suspected pixel sensed at a starting point of a next band consecutive to the band based on a first position of a vertical streak suspected pixel sensed in any one band among the plurality of bands, the sensor may recognize the change in positions of the vertical streak suspected pixels between two consecutive bands.

The sensor may sense positions of the vertical streak suspected pixels regarding a certain number of pixels placed on left and right sides based on the pixel corresponding to the first position.

The image scanning apparatus may additionally include a storage configured to (or adapted to, capable of, operable to, suitable for, etc.) store positions of the vertical streaks sensed in the scan image.

The image scanning apparatus may additionally include a message generator configured to (or adapted to, capable of, operable to, suitable for, etc.) generate an alarm message including vertical streak generating information due to exterior materials when positions of the vertical streaks sensed on at least two consecutive pages included in the scan image are uniform or substantially uniform, and a user interface may further be included which is configured to (or adapted to, capable of, operable to, suitable for, etc.) output the alarm message.

In an embodiment, a vertical streak correcting method of an image scanning apparatus may include scanning a document and generating a scan image, sensing pole points toward (or in) a main scan direction on the scan image, sensing vertical streak suspected pixels based on at least one of a brightness difference and a color difference between the sensed pole points and surrounding pixels of the pole points, and sensing vertical streaks based on a consecutiveness of the vertical streak suspected pixels toward (or in) a sub scan direction, examining or detecting a contents area on the scan image, and correcting the sensed vertical streaks on the scan image by protecting the detected contents area.

The sensing of the vertical streaks may include sensing pole points from pixels placed on a main scan direction on the scan image, calculating a brightness difference between the sensed pole points and surrounding pixels of the pole points, and sensing the sensed pole points to be first vertical streak suspected pixels when the calculated brightness difference is within a predetermined critical range. The sensing may further include calculating a first brightness difference between the first vertical streak suspected pixels and at least two surrounding pixels placed near or on a left side of the first vertical streak suspected pixels and calculating a second brightness difference between the first vertical streak suspected pixels and at least two surrounding pixels placed near or on a right side of the first vertical streak suspected pixels, and sensing the first vertical streak suspected pixels to be second vertical streak suspected pixels when the first brightness difference and the second brightness difference are less than a predetermined critical value. The sensing may further include sensing the second vertical streak suspected pixels to be third vertical streak suspected pixels based on color inclusion and a color ratio between the second vertical streak suspected pixels and surrounding pixels of the second vertical streak suspected pixels.

The sensing the second vertical streak suspected pixels to be third vertical streak suspected pixels may include sensing the second vertical streak suspected pixels to be third vertical streak pixels when all of the second vertical streak suspected pixels and the surrounding pixels have color information, and confirming a color ratio between the second vertical streak suspected pixels and the surrounding pixels, when color information is generated in the second vertical streak suspected pixels while color information is not generated in the surrounded pixels. When the color ratio is less than a predetermined critical value, the second vertical streak suspected pixels may be determined to be third vertical streak suspected pixels.

The sensing vertical streaks may additionally include confirming whether the third vertical streak suspected pixels have consecutiveness toward (or in) a sub scan direction on the scan image, and when at least one of length and frequency regarding the consecutiveness is equal to, or greater than a predetermined critical value, sensing the third vertical streak suspected pixels to be vertical streaks.

The examining or detecting the contents area on the scan image may additionally include examining or detecting the sensed pole points to be a contents area, when the brightness difference calculated at the process of sensing the sensed pole points to be first vertical streak suspected pixels is greater than a maximum critical value in the predetermined critical range, examining or detecting the first vertical streak suspected pixels to be a contents area, when the first brightness difference and the second brightness difference calculated at the process of sensing the first vertical streak suspected pixels to be second vertical streak suspected pixels are greater than a predetermined critical value, and examining or detecting the second vertical streak suspected pixels to be a contents area, when the color ratio confirmed at the process of sensing the second vertical streak suspected pixels to be third vertical streak suspected pixels, is greater than a predetermined critical value.

The sensed pole points may be determined as corresponding to noise pixels when the calculated first brightness difference is less than a minimum critical value in the predetermined critical range. The third vertical streak suspected pixels may be sensed as noise pixels when the length and frequency regarding the consecutiveness is less than the third predetermined critical value.

The sensing vertical streaks may further include dividing the scan image into a plurality of bands and sensing the vertical streak suspected pixels per each band.

The sensing vertical streaks may additionally include, when there is change in a position of a vertical streak suspected pixel sensed at a starting point of next band consecutive to the band based on a first position of a vertical streak suspected pixel sensed in any one band among the plurality of bands, recognizing the change in positions of the vertical streak suspected pixels between two consecutive bands, and sensing positions of the vertical streak suspected pixels regarding a certain number of pixels placed on left and right sides based on the pixel corresponding to the first position in the next band.

The vertical streak correcting method may additionally include storing positions of the vertical streaks sensed on the scan image, generating an alarm message including vertical streak generating information due to exterior materials when positions of the vertical streaks sensed on at least two consecutive pages included in the scan image are uniform or substantially uniform, and outputting the alarm message.

In an embodiment, a non-transitory computer-readable recording medium may be provided which records at least one program, that when executed, implements the vertical streak correcting method in accordance with the example embodiments disclosed herein.

In an embodiment, an image scanning apparatus includes a scanner to scan a document and generate a scan image, a sensor to sense pole points on the scan image, to sense vertical streak suspected pixels by comparing the sensed pole points with pixels surrounding the sensed pole points, and to sense vertical streaks based on characteristics of the vertical streak suspected pixels, a detector to detect a contents area on the scan image, and a corrector to correct the sensed vertical streaks on the scan image according to whether the sensed vertical streaks overlap with the detected contents area.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
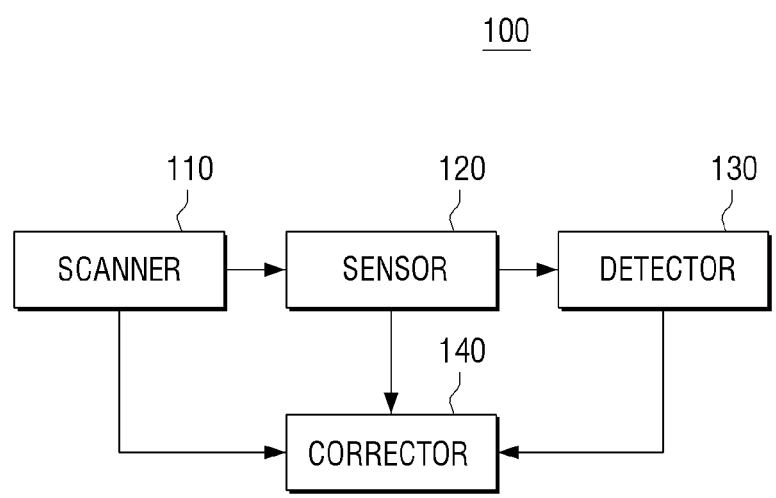
FIG. 1 is a block diagram of an image scanning apparatus according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 shows a block diagram of an image scanning apparatus according to an embodiment. Herein, the image scanning apparatus 100 may be scanner, copy machine, facsimile, multi function peripheral (MFP) which complexly implements these functions with one device, or 3D scanner.

Referring to FIG. 1, the image scanning apparatus 100 may include a scanner 110, a sensor 120, a detector 130, and a corrector 140.

The scanner 110 may generate a scan image by scanning a document. For scanning a document, the scanner 110 may use an auto document feeder (not illustrated). The auto document feeder may automatically provide documents in order to scan consecutive documents.

The sensor 120 may sense vertical streaks included in scan images. When documents are scanned, a black or white vertical streak may be included in scan images due to adsorbed dust on the scanner 110. If this vertical streak is not corrected, the quality of scan images may deteriorate. Thus, in order to correct the vertical streak, the sensor 120 may sense the vertical streak included in scan images.

The sensor 120 may sense pole points toward a main scan direction within scan images. Specifically, the sensor 120 may confirm whether each pixel placed on a main scan direction of the scan images is a minimum point or a maximum point, and sense the corresponding pixel to be a pole point if it is a minimum point or a maximum point.

The sensor 120 may sense vertical streak suspected pixels based on a brightness difference and/or color difference between the sensed pole points and surrounding pixels of the pole points, and senses a vertical streak based on the consecutiveness of the vertical streak suspected pixels toward a sub scan direction. The sub scan direction and main scan direction may be perpendicular to one another.

The detector 130 may detect a contents area on the scan images generated in the scanner 110. The contents area may refer to an area which includes effective data such as text constituted with points and lines or images.

Further, the detector 130 may detect a contents area on the scan images by using the vertical streak sensing results of the sensor 120, as will be discussed in more detail with reference to FIG. 2.

The corrector 140 corrects vertical streaks on the scan images by protecting the detected contents area. Specifically, the corrector 140 may correct the overlapping areas by decreasing an intensity of the correction, when there are overlapping areas confirmed as a result of confirming positions of the vertical streaks and positions of the contents area on the scan images. Thus, the vertical streaks may be deleted or removed by applying an interpolation method on the scan images while correcting the vertical streaks included in the overlapping areas by decreasing an intensity of correction.

Further, the corrector 140 may correct the vertical streaks on the scan images by excluding the vertical streaks included in the overlapping areas.

The vertical streaks may be corrected by the corrector 140 even when the vertical streaks overlap with the contents area on the scan images such that the vertical streaks are corrected without damaging the contents area.

The image scanning apparatus 100 according to an embodiment may precisely sense and correct the vertical streaks even when vertical streaks due to exterior materials are included in the scan images. Further, the image scanning apparatus 100 may correct the vertical streaks without damaging the contents area. Thus, the quality of the scan images can be enhanced.

Figure 2:
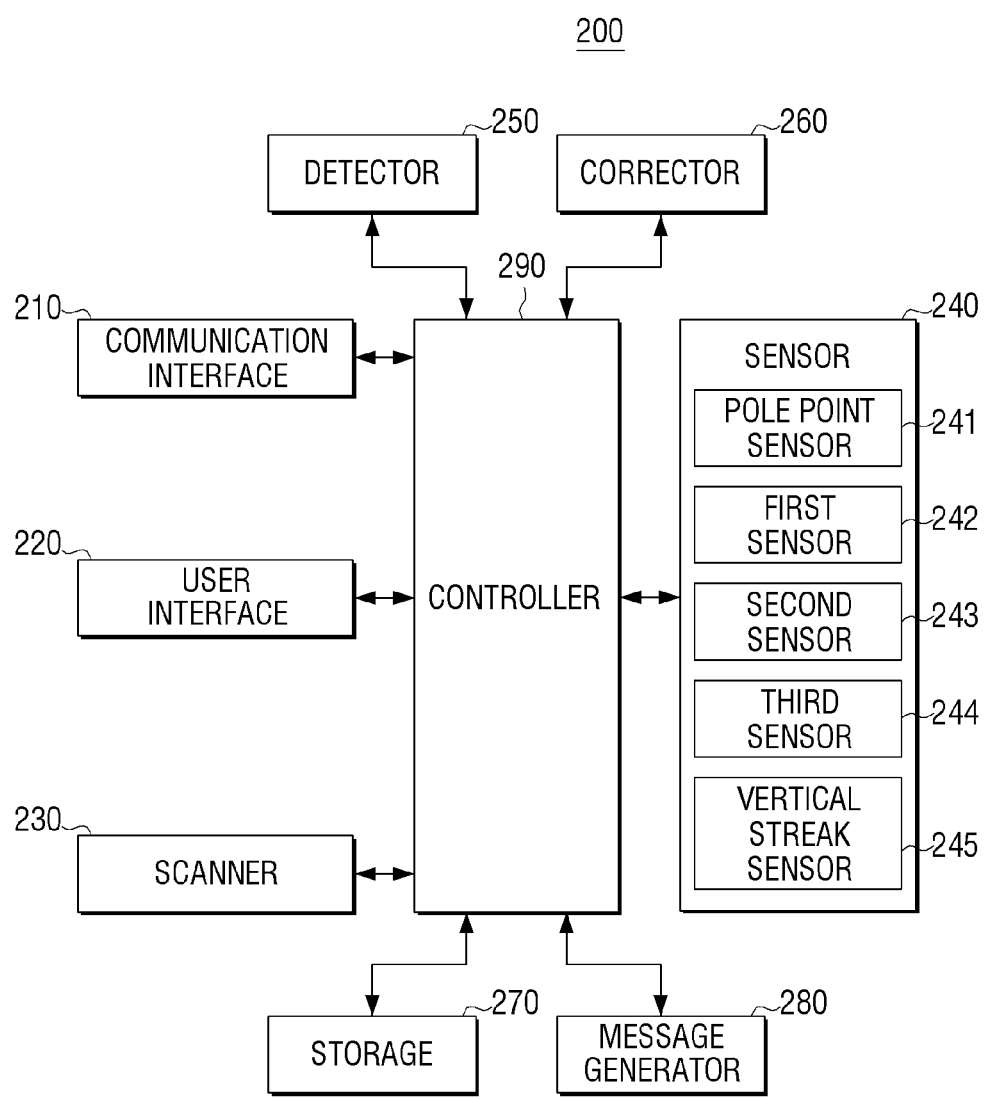
FIG. 2 is a block diagram of an image scanning apparatus according to another embodiment.

FIG. 2 shows a block diagram of the image scanning apparatus according to an example embodiment. The image scanning apparatus 200 may be a scanner, a copy machine, a facsimile, an MFP which complexly implements two or more functions of the scanner, copy machine, and/or facsimile using one device, or a 3D scanner.

Referring to FIG. 2, the image scanning apparatus 200 may include a communication interface 210, a user interface 220, a scanner 230, a sensor 240, a detector 250, a corrector 260, a storage 270, a message generator 280 and a controller 290.

The controller 290 may include a device which controls the general operation of the image scanning apparatus 200, and may control an operation of each unit. The controller may include one or more processors for example.

The communication interface 210 may connect a terminal apparatus (not illustrated) such as a PC, a notebook PC, a PDA, a tablet, a smartphone, a digital camera, and the like, and transmit scan images scanned in the image scanning apparatus 200 to the terminal apparatus. Specifically, the communication interface 210 may be provided to connect the image scanning apparatus 200 with an external device. The communication interface 210 may connect to the terminal apparatus through a wired or wireless network, a combination thereof, (e.g., through a universal serial bus (USB) port, a local area network (LAN), an internet network, and the like).

The user interface 220 may receive a scan command from a user. Further, the user interface 220 may include a plurality of function keys so that a user may establish or select a plurality of functions supported by the image scanning apparatus 200, and display a plurality of information or messages provided from the image scanning apparatus 200.

The user interface 220 may include a device which simultaneously implements inputting and outputting operations such as touch pad, touch screen, or other device (e.g., a device which combines a keyboard, a mouse and a monitor). Further, the user interface 220 may be implemented as device that can simultaneously display a plurality of information or messages while outputting audio or voice information. Generally, the user interface may include, for example, one or more of a keyboard, a mouse, a joystick, a button, a switch, an electronic pen or stylus, an input sound device (e.g., a microphone to receive a voice command), a track ball, a remote controller, a portable (e.g., a cellular or smart) phone, a tablet PC, a pedal or footswitch, a virtual-reality device, and so on. The user interface may further include a haptic device to provide haptic feedback to a user. The user interface may also include a touch screen, for example.

Accordingly, a scan command may be received through the user interface 220. Additionally, or alternatively, a scan command may be received from the terminal apparatus through the user interface 220.

The scanner 230 may scan documents by using the auto document feeder (not illustrated) and may generate one or more scan images.

The sensor 240 may sense the vertical streaks on the scan images. In order to sense the vertical streaks, the sensor 240 may sense a plurality of pole points toward a main scan direction on the scan images, and sense vertical streak suspected pixels by confirming features of each pole point. Further, the sensor 240 may sense the vertical streaks based on the consecutiveness toward a sub scan direction, when the vertical streak suspected pixels are sensed.

Herein, features of each pole point may include one or more of depth features, radius features, and color features regarding each pole point. Such depth features, radius features, and color features regarding each pole point may be confirmed or determined based on a brightness difference and/or a color difference between the pole point and surrounding pixels of the pole point. For example, surrounding pixels may include a portion or all of the pixels which surround or neighbor a pole point. Neighboring or surrounding pixels may include pixels which are within a predetermined distance away from the pole point. Further explanation will be described below.

In order to implement the above functions, the sensor 240 may include one or more of a pole point sensor 241, a first sensor 242, a second sensor 243, a third sensor 244, and a vertical streak sensor 245.

The pole point sensor 241 may sense pole points on scan images. Specifically, the pole point sensor 241 confirms the brightness of pixels placed or disposed on a main scan direction of the scan images, and confirms or determines whether the corresponding pixel is a minimum point or a maximum point based on the brightness of each pixel. As a result of the confirming, when the corresponding pixel includes a minimum point or a maximum point, the corresponding pixel may be sensed to be pole point.

The first to the third sensors 242, 243, 244 are units which sense vertical streak suspected pixels from or based on the sensed pole points.

First, the first sensor 242 may confirm a brightness difference between the plurality of pole points sensed from the pole point sensor 241 and surrounding pixels of the pole points, and sense the first vertical streak suspected pixels from the plurality of pole points using or based on the brightness difference. Herein, a brightness difference between each pole point and surrounding pixels of the pole point may include depth features regarding the corresponding pole point.

Specifically, the first sensor 242 may calculate a brightness difference between one pole point and surrounding pixels of the pole point, and confirm whether the calculated brightness difference is within a predetermined critical range. For example, the surrounding pixels of the pole point may include a portion or all of the pixels which surround or neighbor the pole point. Neighboring or surrounding pixels may include pixels which are within a predetermined distance away from the pole point.

A 'predetermined critical range' refers to a range from a first critical value to a second critical value. The first critical value may refer to a standard value that may determine a brightness difference to be low, and may be the lowest value among the critical range. The second critical value may refer to a standard value that may determine a brightness difference to be large, and may be the highest value among the critical range.

Further, when the calculated brightness difference is within a predetermined critical range, the first sensor 242 may sense the corresponding pole point to be a first vertical streak suspected pixel. Thus, the corresponding pole point may be sensed to have normal depth features which are not too deep and not too shallow.

Further, when the calculated brightness difference is less than the first critical value of the predetermined critical range, the first sensor 242 may sense the corresponding pole point to be a simple noise pixel. Thus, the corresponding pole point may be sensed to have very much shallow depth features.

Further, when the calculated brightness difference is greater than the second critical value of the predetermined critical range, the first sensor 242 may sense the corresponding pole point to be a contents area. Thus, the corresponding pole point may be sensed to have very much deep depth features.

The above described operation of the first sensor 242 may be performed for every pole point.

Meanwhile, the second sensor 243 may calculate a first brightness difference between at least two surrounding pixels placed or disposed near a left side of the first vertical streak suspected pixels, and may calculate a second brightness difference between at least two surrounding pixels placed or disposed near a right side of the first vertical streak suspected pixels. For example, surrounding pixels with respect to a first vertical streak suspected pixel may include a portion or all of the pixels which surround or neighbor the first vertical streak suspected pixel. Neighboring or surrounding pixels may include pixels which are within a predetermined distance away from the first vertical streak suspected pixel.

Further, the second sensor 243 may sense second vertical streak suspected pixels by confirming whether the first brightness difference and the second brightness difference are less than a predetermined critical value. Herein, depth features of the first vertical streak suspected pixels can be confirmed or determined by using the first brightness difference and the second brightness difference.

Specifically, when the first brightness difference and the second brightness difference are less than the predetermined critical value, the second sensor 243 may sense corresponding first vertical streak suspected pixels to be second vertical streak suspected pixels. Herein, when the first brightness difference and the second brightness difference are less than the predetermined critical value, it may indicate that the brightness difference regarding surrounding pixels of corresponding first vertical streak pixels is not large, and the surrounding pixels do not affect the depth of the first vertical streak suspected pixels. Thus, the second sensor 243 may sense the corresponding first vertical streak suspected pixels to have shallow depth features.

Further, when the first brightness difference and/or the second brightness difference are greater than the predetermined critical value, the second sensor 243 may sense the corresponding first vertical streak suspected pixels to correspond to a contents area. Herein, when the first brightness difference and the second brightness difference are greater the predetermined critical value, it may indicate that the brightness difference regarding the surrounding pixels of the corresponding first vertical streak suspected pixels is large, and the surrounding pixels do affect the depth of the first vertical streak suspected pixels. Thus, the corresponding first vertical streak suspected pixels may be sensed to have deep depth features.

One or more first vertical streak suspected pixels may be generated. When there are a plurality of the first vertical streak suspected pixels, the above described operations of the second sensor 243 may be performed for each of the plurality of first vertical streak suspected pixels.

Meanwhile, the third sensor 244 may sense third vertical streak suspected pixels based on color inclusion and a color ratio regarding the second vertical streak suspected pixels and its surrounding pixels. Herein, color inclusion and a color ratio regarding the second vertical streak suspected pixels and their surrounding pixels may refer to color features regarding the second vertical streak suspected pixels.

Specifically, the third sensor 244 may confirm color information regarding the second vertical streak suspected pixels and the surrounding pixels, and sense corresponding second vertical streak suspected pixels to be third vertical streak suspected pixel when all of the pixels include colors. Herein, the surrounding pixels may include a certain number of pixels (e.g., 3~5 pixels in each) which are placed or disposed on a left side and a right side of the second vertical streak suspected pixels. Color information of the surrounding pixels may include average color information regarding the surrounding pixels. For example, the surrounding pixels with respect to a second vertical streak suspected pixel may include a portion or all of the pixels which surround or neighbor the second vertical streak suspected pixel. Neighboring or surrounding pixels may include pixels which are within a predetermined distance away from the first vertical streak suspected pixel.

Further, when color information is confirmed on the second vertical streak suspected pixels and not confirmed on the surrounding pixels, the third sensor 244 may confirm or determine a color ratio between the second vertical streak suspected pixels and the surrounding pixels.

Based on the determination or confirmation result, when the color ratio is less than a predetermined critical value, the second vertical streak suspected pixels may be sensed to be third vertical streak suspected pixels. When the color ratio is greater than the predetermined critical value, the second vertical streak suspected pixels may be sensed to be a contents area.

Herein, when the color ratio is less than the predetermined critical value, it may indicate that colors of the second vertical streak suspected pixels are light, and the corresponding second vertical streak suspected pixels may be generated due to vertical streaks.

Further, when the color ratio is greater than the predetermined critical value, it may indicate that colors of the corresponding second vertical streak suspected pixels are thick, and may correspond to a contents area including text constituted with points and lines and images. For example, for a given second vertical streak suspected pixel, a color ratio may be determined based on a relationship between the color information of the second vertical streak suspected pixel and color information of pixels surrounding the second vertical streak suspected pixel (e.g., average color information). For example, the color ratio may be determined by dividing a value corresponding to the color information of the second vertical streak suspected pixel by a value corresponding to the color information of the pixels surrounding the second vertical streak suspected pixel. Alternatively, the color ratio may be determined by dividing a value corresponding to the color information of the pixels surrounding the second vertical streak suspected pixel by a value corresponding to the color information of the second vertical streak suspected pixel.

One or more second vertical streak suspected pixels may be generated. In some cases it may be desirable to have a plurality of the second vertical streak suspected pixels generated. The above described operation of the third sensor 244 may be performed for each of the plurality of second vertical streak suspected pixels.

Meanwhile, the vertical streak sensor 245 senses vertical streaks based on the consecutiveness of the vertical streak suspected pixels toward a sub scan direction on the scan images.

Specifically, the vertical streak sensor 245 may confirm or determine whether the plurality of the third vertical streak suspected pixels sensed in the third sensor 244 have consecutiveness toward a sub scan direction on the scan images. Whether vertical streak suspected pixels have consecutiveness may refer to whether the vertical streak suspected pixels are sensed in a repeating, successive, or uninterrupted manner in the scan image (e.g., in a particular direction in the scan image). The consecutiveness may be established or determined based on the number of vertical streak suspected pixels which are sensed, the length of the vertical streak suspected pixels, the frequency of the vertical streak suspected pixels, and the like. Thus, for example, when the plurality of the third vertical streak suspected pixels sensed in the third sensor 244 are more than a pre-determined number in a sub scan direction, the vertical streak sensor 245 may confirm that the corresponding third vertical streak suspected pixels have consecutiveness.

In this process, the length and frequency of the consecutiveness may be confirmed. For example, when at least one of the length and the frequency regarding the consecutiveness is greater than a predetermined critical value, the third vertical streak suspected pixels may be sensed to be vertical streaks. Alternatively, both the length and the frequency regarding the consecutiveness may be required to be greater than the pre-determined critical value for the third vertical streak suspected pixels to be sensed to be vertical streaks.

Thus, even if the third vertical streak suspected pixels have consecutiveness toward a sub scan direction, when the length of the consecutiveness is less than a predetermined critical length, they may correspond to simple noise pixels.

Further, even if the third vertical streak suspected pixels have consecutiveness toward a sub scan direction, when the frequency of the consecutiveness is less than a predetermined critical frequency, they may also correspond to simple noise pixels. Thus, correction of sensing vertical streaks may be enhanced by sensing the third vertical streak suspected pixels having a length and/or a frequency of consecutiveness more than the respective predetermined critical values, to be vertical streaks.

Meanwhile, the sensor 240, (including, for example the first to the third sensors 242, 243, 244) may divide the scan images into a plurality of bands, and sense vertical streak suspected pixels per each band when the above described operations of sensing vertical streak suspected pixels is performed by each respective sensor.

For example, when the scan images include at least one page, the sensors may divide each page into at least two bands, and perform sensing vertical streaks per each band.

During this process, when there is change in a position of a vertical streak suspected pixel sensed at a starting point of a second band consecutive to a first band based on a first position of the vertical streak suspected pixels sensed in the first band among the plurality of bands, the sensor 240 may recognize the change in positions of the vertical streak suspected pixels between the two consecutive bands. When the positions of the vertical streak suspected pixels between the two bands change, it may indicate that positions of exterior materials adsorbed onto the scanner 110 have changed while generating the scan images.

Further, the sensor 240 may sense vertical streak suspected pixels from a certain number of pixels (e.g., about 3~5 pixels) which are placed or disposed on a left side and a right side based on a corresponding pixel with respect to a first position of the second band consecutive to the first band. This process considers that exterior materials usually move within a certain number of pixels.

As described above, because the sensor 240 senses vertical streak suspected pixels per each band, a change in position of vertical streak suspected pixels within the same page can be instantly recognized, and vertical streak suspected pixels can be precisely sensed in each band.

The detector 250 may detect a contents area on the scan images by using the sensing results of one or more of the first to the third sensors 242, 243, 244. Specifically, when the calculated brightness difference of the first sensor 242 is greater than the second critical value among the predetermined critical range (e.g., a maximum value of the critical range), the detector 250 may detect the corresponding pole points to be a contents area.

Further, when the first brightness difference and the second brightness difference calculated in the second sensor 243 are equal to, or greater than the predetermined critical value, the detector 250 may detect the corresponding first vertical streak suspected pixels to be a contents area.

Further, when a color ratio between the second vertical streak suspected pixels and the surrounding pixels confirmed in the third sensor 244 is greater than the predetermined critical value, the detector 250 may detect the second vertical streak suspected pixels to be a contents area.

As described above, the detector 250 may detect a contents area by using the sensing results of the first to the third sensors 242, 243, 244, or may detect a contents area based on information regarding the contents area sensed in the first to the third sensors 242, 243, 244.

The corrector 260 may correct vertical streaks on the scan images by protecting the contents area. Specifically, the corrector 260 may confirm whether there is an overlapping area between positions of vertical streaks and positions of a contents area on the scan images. If an overlapping area is confirmed, the corrector 260 may correct the vertical streaks by decreasing an intensity of correction of the vertical streaks regarding the overlapping area or by excluding the vertical streaks from the overlapping area.

The storage 270 may store the scan images generated in the scanner 230. In this case, the scan images may include a document image corresponding to one page or may include document images corresponding to a plurality of pages (for example, consecutive pages). Here, a page may refer to a single sheet of the printing medium. It is possible that multiple pages of a document to be copied or scanned may be processed through options or features available in the image scanning apparatus so that the multiple pages which are scanned are output as a single page. For example, a document consisting of two pages may be scanned (i.e, both pages are scanned by the image scanning apparatus, and then the scanned data of the two pages may be output as one page (i.e., the scanned image presented as one page contains data from both pages). For example, the storage may be embodied as a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage are not limited to the above description, and the storage may be realized by other various devices and structures as would be understood by those skilled in the art.

Further, the storage 270 may store positions of the vertical streaks sensed in the sensor 240, or store positions of the contents area detected in the detector 250. Herein, positions of the vertical streaks may be desirably stored on a page by page (or sheet by sheet) basis.

Meanwhile, when the positions of the vertical streaks sensed from at least two consecutive pages included in the scan images are uniform (i.e., vertical streaks on two consecutive pages are disposed in substantially the same positions), the message generator 280 may generate an alarm message including information regarding generating the vertical streaks due to the presence of exterior materials. The alarm message may include video signals or voice signals, or combinations thereof, and outputted through the user interface 220.

The image scanning apparatus 200 according to the above disclosed example embodiments may precisely detect and correct the vertical streaks included in the scan images, and further, correct the vertical streaks without damaging the contents area. Thus, the quality of the scan images may be enhanced.

Further, a change in position of the vertical streak suspected pixels may be instantly recognized by dividing the scan images on a band basis and sensing the vertical streak suspected pixels per each band.

Further, the image scanning apparatus 200 may provide an alarm message regarding the vertical streaks repeatedly sensed due to exterior materials. Therefore, a user can quickly recognize and address the reduction in quality of the scanned images due to the vertical streaks.

Meanwhile, although FIG. 2 illustrates and describes that the sensor 240 of the image scanning apparatus 200 includes the first sensor 242, the second sensor 243, and the third sensor 244, it may not be limited to herein. Specifically, the sensor 240 may include any one of the first sensor 242, the second sensor 243, and the third sensor 244 as well as the pole point sensor 241 and the vertical streak sensor 245.

For example, when the sensor 240 includes the pole point sensor 241, the first sensor 242, and the vertical streak sensor 245, the first sensor 242 may confirm a brightness difference between the plurality of pole points and the surrounding pixels detected from the pole point sensor 241, and sense vertical streak suspected pixels from the plurality of pole points based on the brightness difference.

For another example, when the sensor 240 includes the pole point sensor 241, the second sensor 243, and the vertical streak sensor 245, the second sensor 243 may confirm a brightness difference between the plurality of pole points and their surrounding pixels detected from the pole point sensor 241, and calculate a first brightness difference between the pole points and at least two surrounding pixels placed near (or adjacent to) a left side of the pole points, and a second brightness difference between the pole points and at least two surrounding pixels placed near (or adjacent to) a right side of the pole points. Further, the vertical streak sensor 245 may sense vertical streak suspected pixels by confirming whether the first brightness difference and the second brightness difference are less than the predetermined critical value.

For another example, when the sensor 240 includes the pole point sensor 241, the third sensor 244, and the vertical streak sensor 245, the third sensor 244 may confirm vertical streak suspected pixels by confirming color inclusion and color ratio between the plurality of pole points and their surrounding pixels detected from the pole point sensor 241.

As described above, the sensor 240 may include any one of the first sensor 242, the second sensor 243, and the third sensor 244 as well as the pole point sensor 241 and the vertical streak sensor 245. Further, the sensor 240 may include any two of the first sensor 242, the second sensor 243, and the third sensor 244.

Figure 3A:
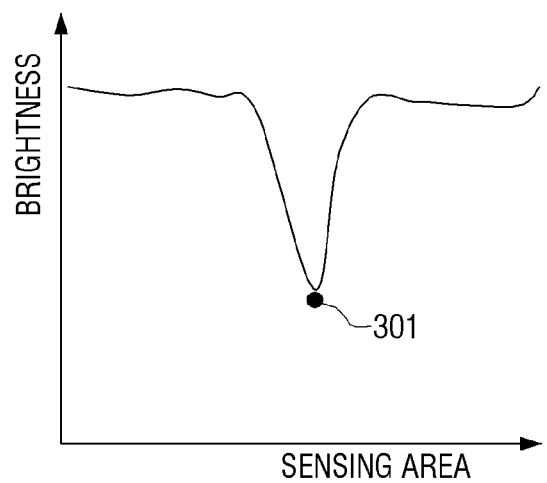
FIGS. 3A and 3B are diagrams describing a minimum point and a maximum point in order to sense pole points according to an embodiment.
Figure 3B:
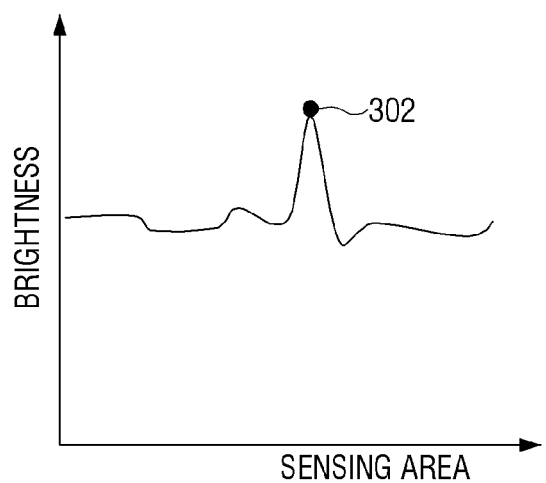

FIGS. 3A and 3B are diagrams describing a minimum point and a maximum point in order to sense pole points according to an embodiment.

FIG. 3A describes a minimum point 301 included in a sensing area of a scan image, and FIG. 3B describes a maximum point 302 included in the sensing area of the scan image. The minimum point 301 may correspond to a pixel having the lowest brightness value in the sensing area and the maximum point 302 may correspond to a pixel having the highest brightness value in the sensing area.

For example, when one pixel is determined to be standard pixel N, and each of three pixels placed on a left side and a right side of the standard pixel N, i.e., N−3, N−2, N−1, N+1, N+2, N+3 satisfy conditions of N≤N±1, N<N±2, N<N±3, the standard pixel N may be sensed as a minimum point.

Further, when the three pixels placed on the left side and the right side of the standard pixel N satisfy conditions of N≥N±1, N>N±2, N>N±3, the standard pixel N may be sensed as a maximum point. Thus, when any one pixel includes a minimum point or a maximum point in the sensing area, the corresponding pixel may be sensed as a pole point.

Herein, the scan image may be divided into two or more sensing areas, and the determining of a minimum point or a maximum point may be performed for each divided sensing area.

FIGS. 4 to 7C are diagrams describing a method for sensing vertical streak suspected pixels according to an embodiment.

According example embodiments disclosed herein, vertical streak suspected pixels may include depth features, radius features and/or color features regarding each pole point sensed in the scan images. Such depth features, radius features and color features of each pole point may be confirmed based on a brightness difference and a color difference between the pole point and surrounding pixels of the pole point.

Figure 4:
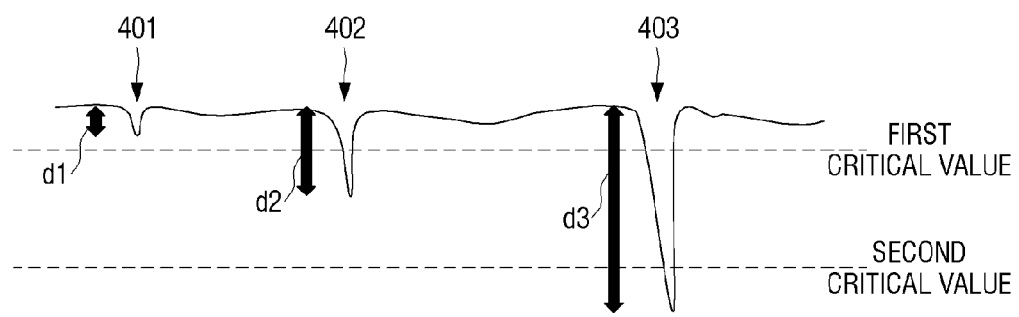
FIGS. 4 to 7C are diagrams describing a method for sensing vertical streak suspected pixels according to an embodiment.

First, FIG. 4 is a diagram describing a method for sensing first vertical streak suspected pixels from pole points. Referring to FIG. 4, when first to third pole points 401, 402, 403 are sensed, first vertical streak suspected pixels may be sensed by confirming depth features of first to third pole points 401, 402, 403.

Specifically, brightness differences d1, d2, d3 between the first to the third pole points 401, 402, 403 and the pixels surrounding each of the first to the third pole points 401, 402, 403, may be determined, and it can be confirmed whether the calculated brightness differences d1, d2, d3 are within a first critical value and a second critical value.

Herein, the first critical value and the second critical value may be used to establish a predetermined critical range. That is, the first critical value may be a standard value that can a determine brightness difference to be low and the second critical value may be a standard value that can determine a brightness difference to be large.

Referring to FIG. 4, the second pole point 402, which has the brightness difference d2 which is between the first critical value and the second critical value, may show normal depth features and may be sensed to be a first vertical streak suspected pixel.

Further, the first pole point 401, which has the brightness difference d1 which is less than the first critical value, may show shallow depth features and may be sensed to be a simple noise pixel. Further, the third pole point 403, which has the brightness difference d3 which is exceeding the second critical value, may show very thick or deep depth features, and may be sensed to be a contents area.

Figure 5:
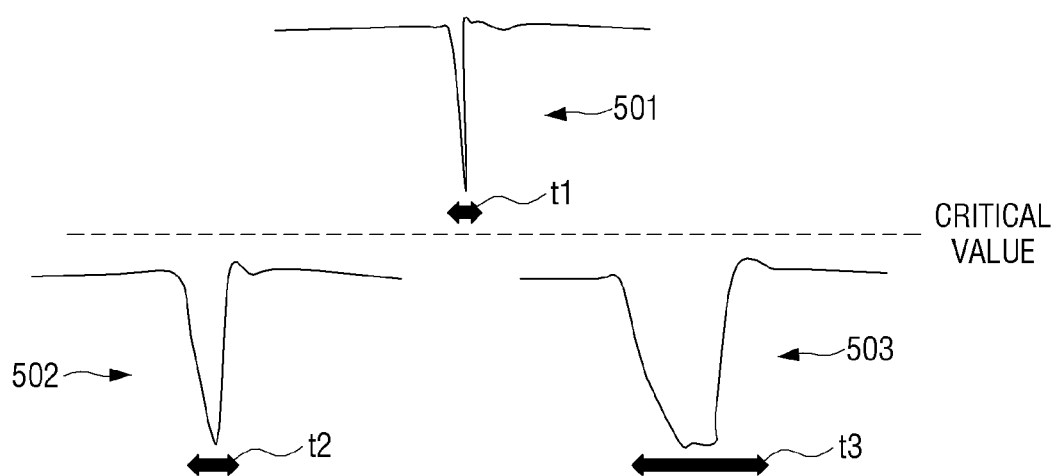

FIG. 5 shows a diagram describing a method for sensing second vertical streak suspected pixels from the first vertical streak suspected pixels 501, 502, 503. Referring to FIG. 5, when the three first vertical streak suspected pixels 501, 502, 503 are sensed from a plurality of pole points, the second vertical streak suspected pixels may be confirmed by confirming radius features of the three first vertical streak suspected pixels 501, 502, 503.

For example, the first vertical streak suspected pixel 501 having the radius t1 which is less than a predetermined critical value may be sensed to be a second vertical streak suspected pixel among the three first vertical streak suspected pixels 501, 502, 503.

Meanwhile, the first vertical streak suspected pixels 502, 503 having the radii t2, t3 which exceeds the predetermined critical value may be sensed to be a contents area among the three first vertical streak suspected pixels 501, 502, 503.

Radius features of the three first vertical streak suspected pixels 501, 502, 503 may be confirmed based on a brightness difference between each of the three first vertical streak suspected pixels 501, 502, 503 and surrounding pixels, as discussed in more detail with reference to FIGS. 6A and 6B.

Figure 6A:
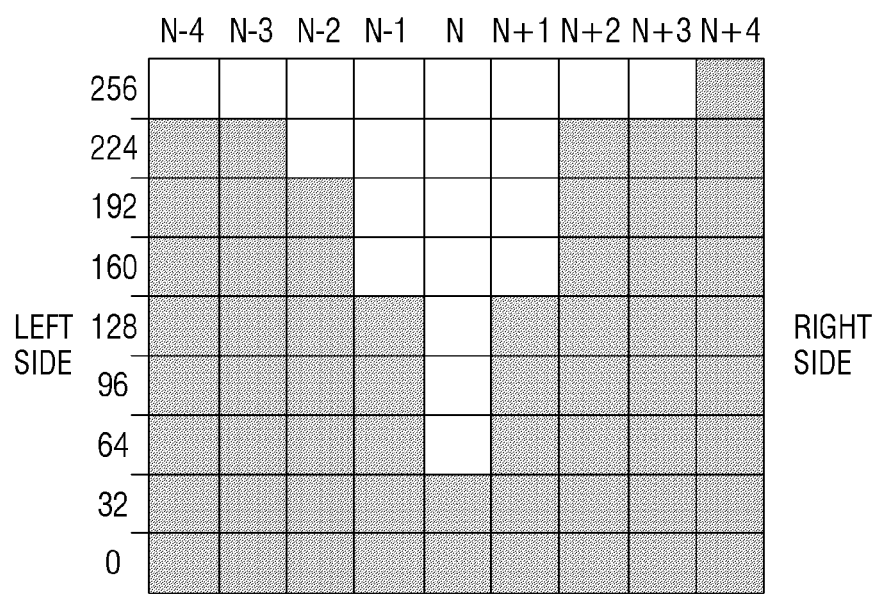
Figure 6B:
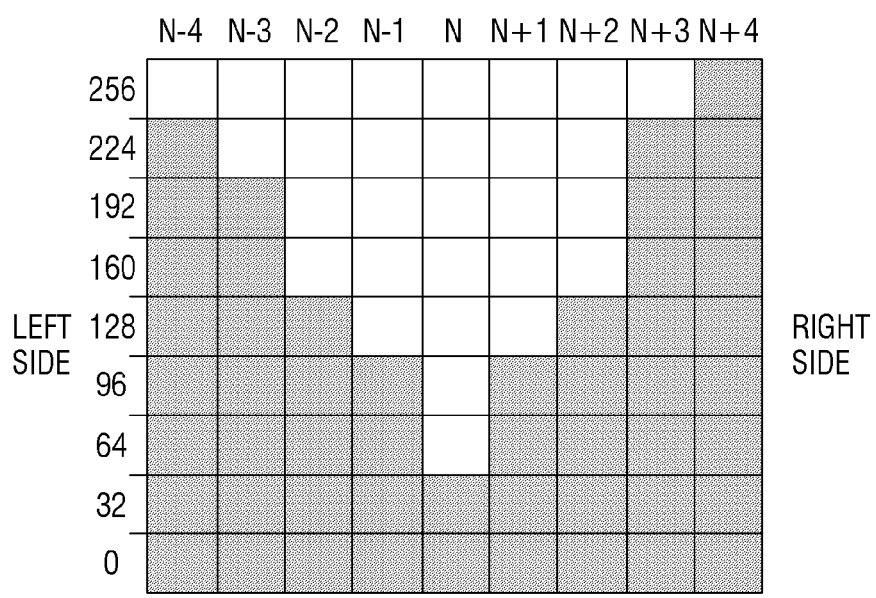

Referring to FIGS. 6A and 6B, on a left side and a right side of the first vertical streak suspected pixel N arranged may be surrounding pixels N−4, N−3, N−2, N−1, N+1, N+2, N+3, N+4. Herein, a first brightness difference between at least two surrounding pixels placed on a left side of the first vertical streak suspected pixel N and a second brightness difference between at least two surrounding pixels placed on a right side are calculated. Radius features of the first vertical streak suspected pixel N may be confirmed from the first brightness difference and the second brightness difference. Herein, the first brightness difference and the second brightness difference may be absolute values.

For example, in FIGS. 6A and 6B, a first brightness difference between second and third surrounding pixels N−2, N−3 which are placed near a left side of the first vertical streak suspected pixel N may be calculated. A second brightness difference between second and third surrounding pixels N+2, N+3 placed near on a right side of the first vertical streak suspected pixel N may also be calculated.

For example, as illustrated in FIG. 6A, when the first brightness difference and the second brightness difference are less than a predetermined critical value (e.g., 50), the depth of the first vertical streak suspected pixel N may be less than 3 pixels. When the depth of the first vertical streak suspected pixel N is less than a predetermined critical depth (e.g., 5 pixels), the first vertical streak suspected pixel may be sensed to be a second vertical streak suspected pixel.

Meanwhile, as illustrated in FIG. 6B, when the first brightness difference and the second brightness difference are equal to, or greater than a predetermined critical value (e.g., 50), the depth of the first vertical streak suspected pixel N may be 5 pixels to 7 pixels. Thus, when the depth of the first vertical streak suspected pixel N is equal to, or greater than a predetermined critical depth (e.g., 5 pixels), the first vertical streak suspected pixel N may be sensed to be a contents area.

In order to sense the second vertical streak suspected pixel from the first vertical streak suspected pixel N, a following mathematical formula may be used.

$$\{\text{DIFF}(Y_{N+2}, Y_{N+3}) < \text{CRITICAL VALUE}\} \ \& \ \{\text{DIFF}(Y_{N-2}, Y_{N-3}) < \text{CRITICAL VALUE}\} \quad \text{[Formula 1]}$$

In Formula 1, $Y_{N+2}, Y_{N+3}$ correspond to brightness values of surrounding pixels disposed at a right side of the first vertical streak suspected pixel N (for example, two to three pixels to the right of first vertical streak suspected pixel N. Meanwhile, $Y_{N-2}, Y_{N-3}$ correspond to brightness values of surrounding pixels disposed at a left side of the first vertical streak suspected pixel N (for example, two to three pixels to the left of first vertical streak suspected pixel N). Further, DIFF ($Y_{N+2}, Y_{N+3}$) and DIFF ($Y_{N-2}, Y_{N-3}$) corresponds to the first brightness difference and the second brightness difference between the surrounding pixels. When all of (or both) the first brightness difference and the second brightness difference are less than a predetermined critical value, the depth of the first vertical streak suspected pixel N may be confirmed to be thinner (shallower) than a predetermined critical depth.

Figure 7A:
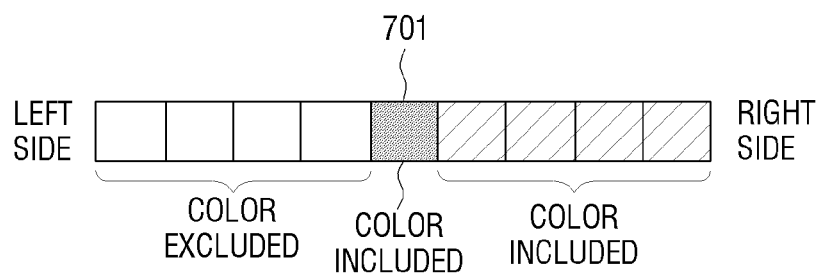
Figure 7B:
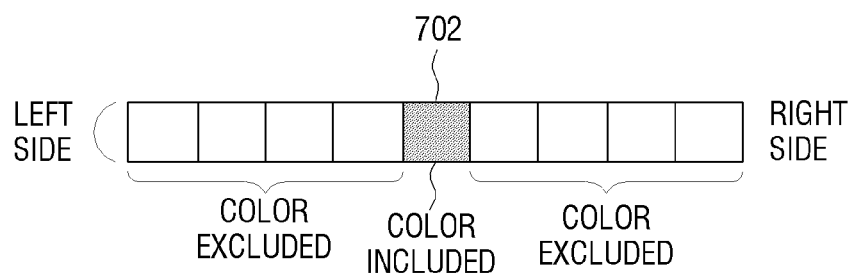
Figure 7C:
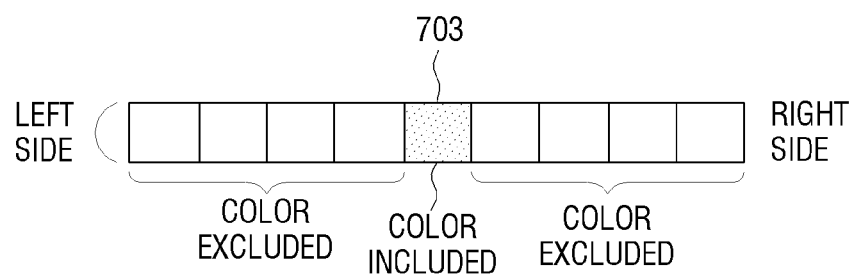

FIGS. 7A to 7C show diagrams describing a method for sensing third vertical streak suspected pixels from the second vertical streak suspected pixels.

Referring to FIGS. 7A to 7C, the third vertical streak suspected pixels may be sensed by confirming color features of the second vertical streak suspected pixels 701, 702, 703. Herein, color features of the second vertical streak suspected pixels 701, 702, 703 may be confirmed by using color inclusion and a color ratio between the second vertical streak suspected pixels 701, 702, 703 and their surrounding pixels.

First, as illustrated in FIG. 7A, whether colors are included on the second vertical streak suspected pixel 701 and its surrounding pixels is confirmed. When colors are included on the second vertical streak suspected pixel 701, and colors are included on the surrounding pixels placed disposed on a left side and/or a right side of the second vertical streak suspected pixel 701, the second vertical streak suspected pixel 701 may be sensed to be a third vertical streak suspected pixel.

Meanwhile, as illustrated in FIGS. 7B and 7C, when colors are included on the second vertical streak suspected pixels 702, 703 and colors are not included in their surrounding pixels placed near on a left side or a right side of the second vertical streak suspected pixels 702, 703, a color ratio of the second vertical streak suspected pixels 702, 703 and their surrounding pixels is confirmed.

As illustrated in FIG. 7B, when a color ratio between the second vertical streak suspected pixel 702 and its surrounding pixels is high, i.e., when the color ratio is greater than a predetermined critical value, the second vertical streak suspected pixel 702 may be sensed to be a contents area in which colors are included.

Meanwhile, as illustrated in FIG. 7C, when a color ratio between the second vertical streak suspected pixel 703 and its surrounding pixels is low, i.e., when a color ratio is less than a predetermined critical value, the second vertical streak suspected pixel 703 may be sensed to be a third vertical streak suspected pixel.

Figure 8A:
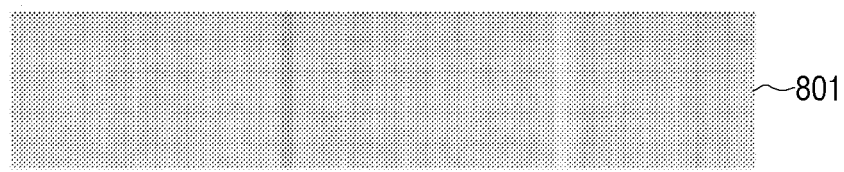
FIGS. 8A to 8C are images describing a method for sensing vertical streak suspected pixels from scan images according to an embodiment.
Figure 8B:
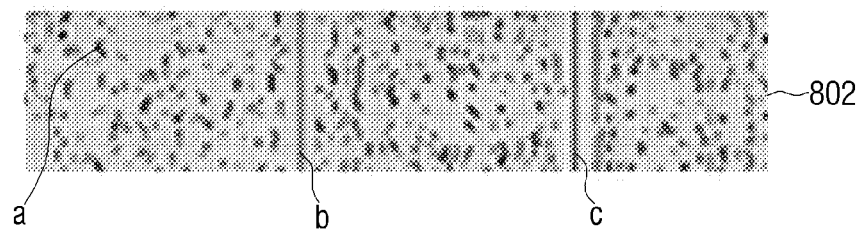
Figure 8C:
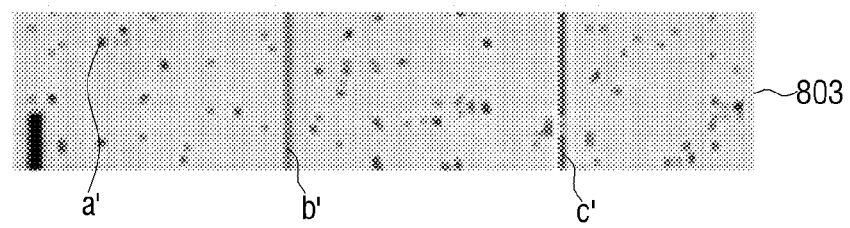

FIGS. 8A to 8C are images describing a method for sensing vertical streak suspected pixels from scan images according to an embodiment.

FIG. 8A is a scan image 801 generated by scanning a document, and FIG. 8B is a first image 802 including pole points a, b, c sensed on the scan image 801. The first image 802 may include a plurality of pole points in addition to the pole points a, b, c which are shown in FIG. 8B for purposes of explanation.

FIG. 8C is a second image 803 including vertical streak suspected pixels a', b', c' sensed from the pole points a, b, c included in the pole point image 802. In order to sense the vertical streak suspected pixels a', b', c', features of the pole points a, b, c included in the first image 802 may be confirmed. Features of the pole points a, b, c may include depth features, radius features, and color features regarding each pole point. Such features can be confirmed based on a brightness difference and a color difference between the pole points and their surrounding pixels.

Figure 9A:
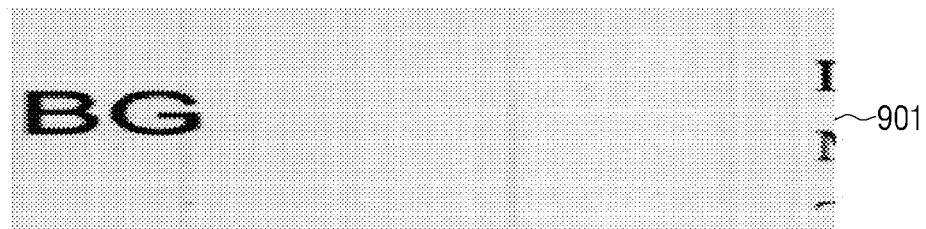
FIGS. 9A and 9B are images describing a method for sensing vertical streaks from the vertical streak suspected pixels sensed in scan images according to an embodiment.
Figure 9B:
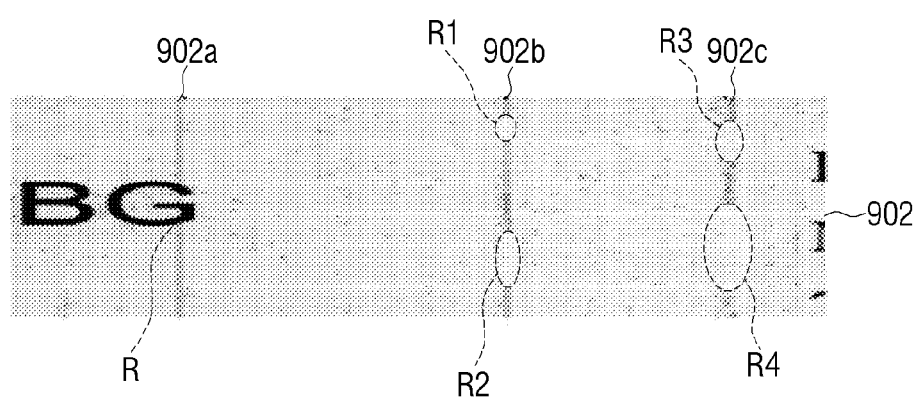

FIGS. 9A and 9B are images describing a method for sensing vertical streaks from the vertical streak suspected pixels sensed in the scan images according to an embodiment.

FIG. 9A is a scan image 901 generated by scanning a document. The scan image 901 may include a contents area such as text and a vertical streak area generated due to the presence of exterior materials.

FIG. 9B is an image 902 including a plurality of vertical streak suspected pixels sensed in the scan image 901.

The image scanning apparatus may confirm whether the plurality of vertical streak suspected pixels included in this image 902 have consecutiveness toward a sub scan direction. Specifically, when the plurality of vertical streak suspected pixels are successive toward a sub scan direction by a certain number of pixels (e.g., 10 pixels) or more than that, at a first position 902a, a second position 902b, and a third position 902c of the image 902, the plurality of vertical streak suspected pixels are confirmed to have consecutiveness.

During this process, the length and the frequency of the consecutiveness may be determined or confirmed. When any one or both of the length and the frequency regarding the consecutiveness is equal to, or greater than a predetermined critical value, the vertical streak suspected pixels may be sensed to be vertical streaks on the corresponding positions. Alternatively, both of the length and the frequency regarding the consecutiveness may be required to be equal to, or greater than a predetermined critical value, in order for the vertical streak suspected pixels to be sensed to be vertical streaks on the corresponding positions.

That is, even if the plurality of vertical streak suspected pixels have consecutiveness on the first position 902a, the second position 902b, and the third position 902c of the image 902, when the length of the consecutiveness is short or the frequency of the consecutiveness is low, the corresponding vertical streak suspected pixels may be simple noise pixels. Thus, vertical streaks may be sensed by considering this point.

Referring to FIG. 9B, the vertical streak suspected pixels on the first position 902a have a seam part R cut by texts; however, because the length of the consecutiveness is equal to, or greater than a predetermined critical length, they may be sensed as vertical streaks.

Further, the vertical streak suspected pixels on the second position 902b have seam parts R1, R2; however, because the frequency of the consecutiveness is equal to, or greater than a predetermined critical frequency, they may be sensed as vertical streaks. In this case, the frequency of the consecutiveness indicates how many vertical streak suspected pixels successive toward a sub scan direction are included. The frequency may be based upon a basic number of vertical streak suspected pixels successive toward the corresponding sub scan direction, or it may be based upon a ratio of vertical streak suspected pixels to non-vertical streak suspected pixels in the sub scan direction. For example, when the basic number of the vertical streak suspected pixels successive by more than a certain number in a corresponding sub scan direction is equal to, or greater than three times the number of pixels in the sub scan direction, or when the ratio of the vertical streak suspected pixels on corresponding sub scan direction is equal to, or greater than 60%, they may be sensed as vertical streaks.

Meanwhile, because the vertical streak suspected pixels on the third position 902c have consecutiveness while the length of the consecutiveness or the frequency of the consecutiveness is less than a predetermined critical value due to seam parts R3, R4, they may be sensed as simple noise pixels.

Figure 10A:
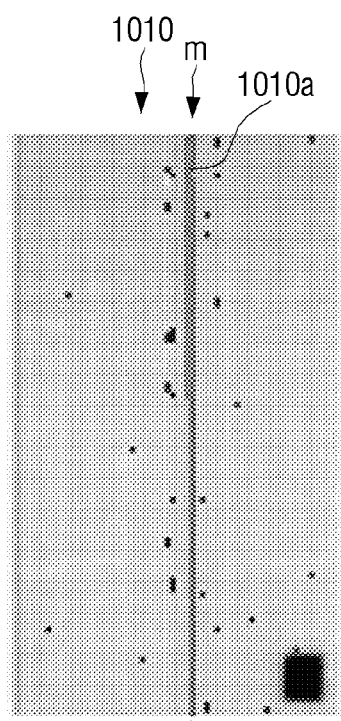
FIGS. 10A and 10B are images describing a method for renewing and sensing positions of vertical streaks according to an embodiment.
Figure 10B:
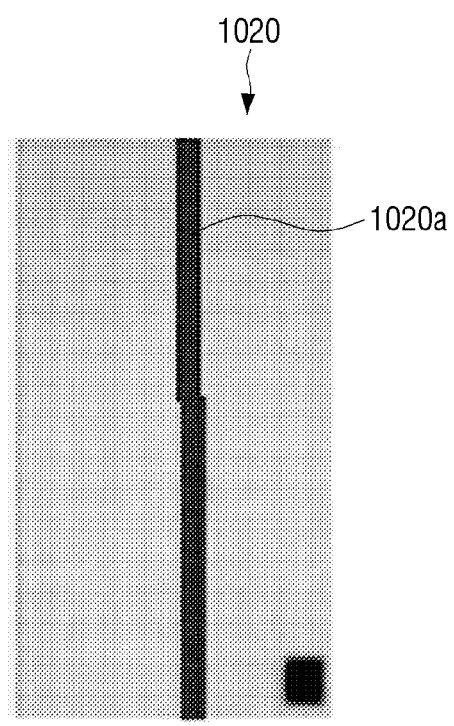

FIGS. 10A and 10B are images describing a method for renewing and sensing positions of vertical streak suspected pixels according to an embodiment.

The image scanning apparatus according to the example embodiments disclosed herein may divide the scan images into a plurality of bands and sense vertical streak suspected pixels per each band when the operation of sensing vertical streak suspected pixels is performed on scan images.

FIG. 10A is a first band image 1010 divided from the scan images and FIG. 10B is a second band image 1020 divided from the scan images. The first band image 1010 may be included in the same page with the second band image 1020, and may be consecutive to the second band image 1020 (i.e., directly connected to or adjacent to one another). Thus, on the same page, the first band image 1010 may be positioned first and the second band image 1020 may be positioned next to the first band image 1010.

The image scanning apparatus may perform the operation of sensing vertical streak suspected pixels regarding the second band image 1020 when the operation of sensing vertical streak suspected pixels 1010a regarding the first band image 1010 is completed. During this process, when a position of a vertical streak suspected pixel sensed on a starting point of the second band image 1020 changes to a second position, not to a first position, the image scanning apparatus may recognize the change in positions of the vertical streak suspected pixels between the two consecutive bands.

For example, when vertical streak suspected pixels are sensed per page, not per band, the image scanning apparatus may sense vertical streak suspected pixels regarding the whole page by considering positions of the sensed vertical streak suspected pixels at a starting point of each page. Thus, when exterior materials move while scanning the corresponding page, it may not precisely sense vertical streak suspected pixels according to (or because of) movement of exterior materials. By considering this point, the image scanning apparatus may instead sense vertical streak suspected pixels per each band.

Referring to FIG. 10B, positions of the vertical streak suspected pixels may be sensed regarding a certain number of pixels (e.g., 3 pixels) placed on left and right sides based on a pixel corresponding to a first position m. Thus, positions of the vertical streak suspected pixels may be sensed by determining the pixel on the first position and three pixels placed on left and right sides as sensing area 1020a.

FIGS. 11A to 11D are images describing a vertical streak correcting method which protects a contents area according to an embodiment.

Figure 11A:
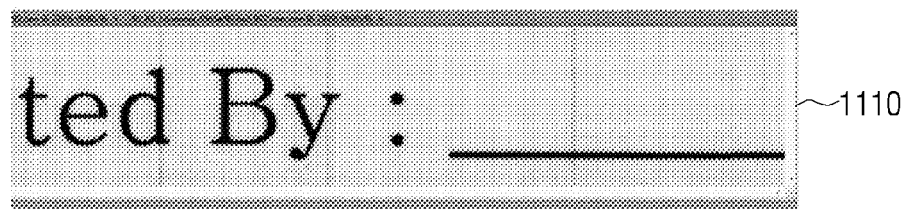
FIGS. 11A to 11D are images describing a method for correcting vertical streaks by protecting contents area according to an embodiment.
Figure 11B:
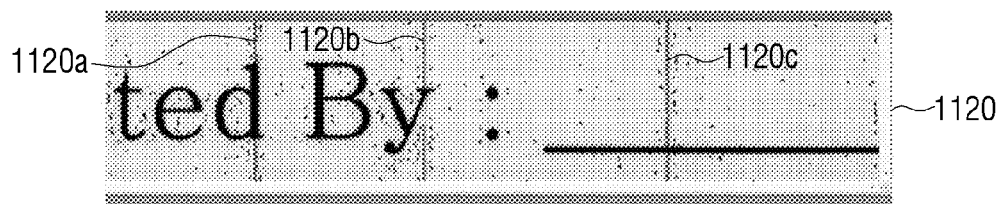
Figure 11C:
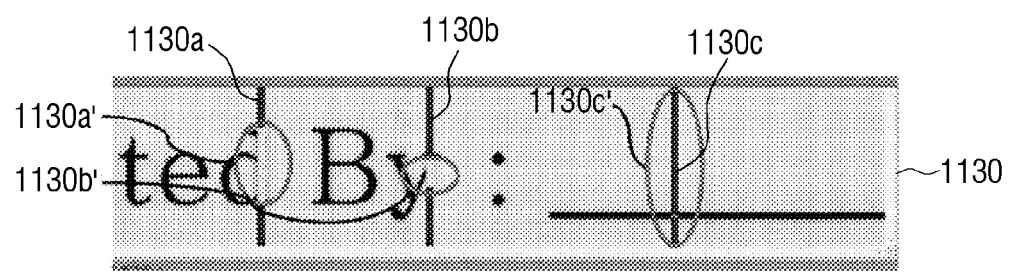

FIG. 11A shows an example of a scan image 1110 generated by scanning a document, FIG. 11B is a first image 1120 including vertical streak suspected pixels 1120a, 1120b, 1120c sensed on the scan image 1110, and FIG. 11C is a second image 1130 including vertical streaks 1120a, 1120b, 1120c sensed on the first image 1120.

Referring to the second image 1130 illustrated in FIG. 11C, the vertical streaks 1130a, 1130b, 1130c include overlapping areas 1130a', 1130b', 1130c' which overlap with the contents area included in the scan image 1110.

Figure 11D:
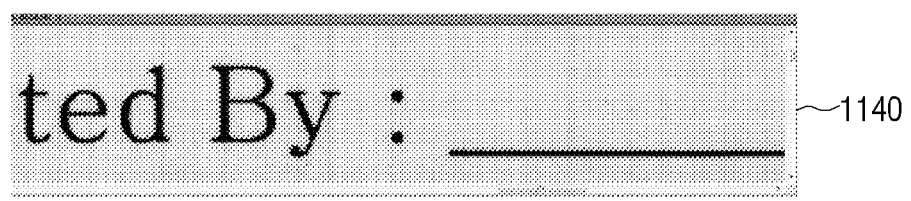

When the vertical streaks 1130a, 1130b, 1130c are corrected without protecting contents area on the scan image 1110, contents included in the overlapping areas 1130a', 1130b', 1130c' may be damaged. Thus, when the vertical streaks 1130a, 1130b, 1130c are corrected, it may be performed by decreasing an intensity of correction regarding the overlapping areas 1130a', 1130b', 1130c' or by excluding the vertical streaks included in the overlapping areas 1130a', 1130b', 1130c'. That is, the vertical streaks included in the overlapping areas are excluded from correction or an intensity of the correction is reduced. As a result of the correcting, a corrected image 1140 as illustrated in FIG. 11D may be generated.

Figure 12:
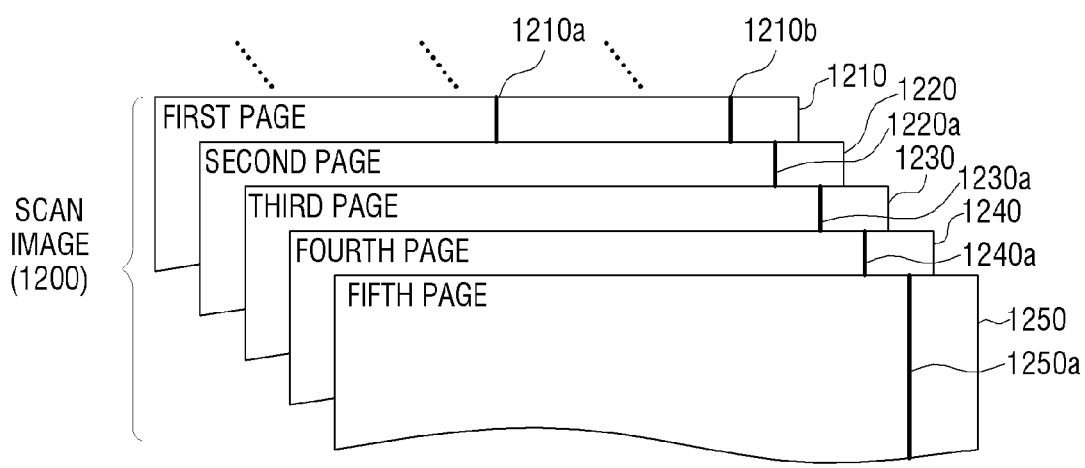
FIG. 12 is a diagram describing a process of providing an alarming message regarding positions of vertical streaks in scan images according to an embodiment.

FIG. 12 is a diagram describing a process of providing an alarming message regarding positions of vertical streaks in scan images according to an embodiment.

Referring to FIG. 12, a scan image 1200 may include first to fifth consecutive pages 1210, 1220, 1230, 1240, 1250. Positions of the vertical streaks sensed in the first to the fifth pages 1210, 1220, 1230, 1240, 1250 may be stored in the storage.

When positions of the vertical streaks 1210a, 1210b, 1220a, 1230a, 1240a, 1250a which are sensed in at least two pages among the first to the fifth consecutive pages 1210, 1220, 1230, 1240, 1250 are substantially uniform, an alarm message including information regarding generation of vertical streaks due to exterior materials may be provided to a user (for example, in a video and/or voice format). Herein, the alarm message may be provided when the positions of the vertical streaks sensed in at least two pages are uniform or substantially uniform; however, the number of pages to be used as a determination of when to provide an alarm message is not limited and may be modified by a manufacturer, a manager or a user.

In cases, when the vertical streaks 1210a, 1210b are sensed only on the first page 1210 and any vertical streak is not sensed on the next pages, information may not be provided to a user by considering that exterior materials are out of the images.

Figure 13:
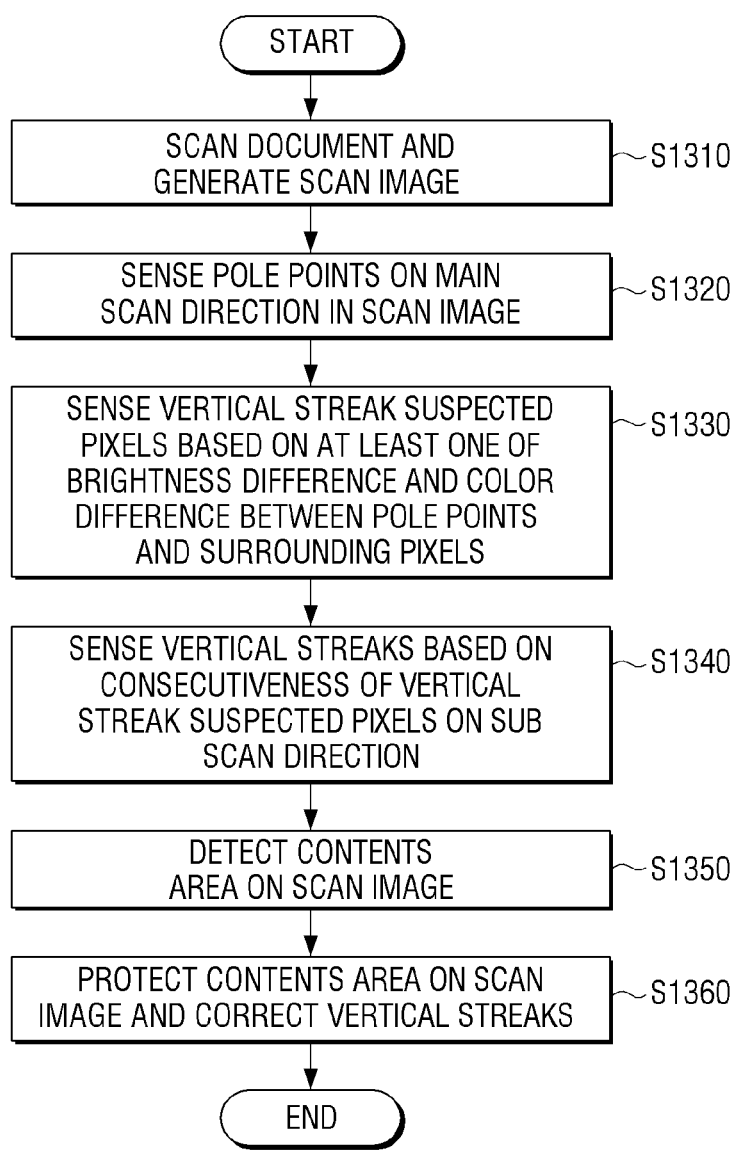
FIG. 13 is a flowchart explaining a method for correcting vertical streaks according to an embodiment.

FIG. 13 is a flowchart explaining a vertical streak correcting method according to an embodiment.

The vertical streak correcting method scans a document according to a scan command (or copy command) and generates a scan image at S1310.

When scanning a document, vertical streaks may be included in the scan image if exterior materials are adsorbed onto the flat glass included in the scanner 110, 230. Therefore, it may be necessary to sense and correct the vertical streaks.

Meanwhile, the vertical streak correcting method senses pole points toward a main scan direction within the scan image at S1320, and senses vertical streak suspected pixels based on at least one of brightness difference and color difference between the sensed pole points and their surrounding pixels at S1330.

At S1340, the vertical streak correcting method senses vertical streaks based on the consecutiveness of the vertical streak suspected pixels toward a sub scan direction. Specifically, when the vertical streak suspected pixels sensed at S1330 are successive toward a sub scan direction, it may indicate that these vertical streak suspected pixels form vertical streaks. Thus, vertical streaks may be sensed by confirming the consecutiveness of the vertical streak suspected pixels toward a sub scan direction. For sensing to be more accurate, the pixels may be sensed to be vertical streaks when the length of the consecutiveness is equal to, or greater than a predetermined critical length and/or when the frequency of the consecutiveness is equal to, or greater than a predetermined critical frequency.

Meanwhile, the vertical streak correcting method detects a contents area on the scan image at S1350, and corrects the vertical streaks by protecting the contents area on the scan image at S1360. Specifically, when there are overlapping areas by confirming positions of the vertical streaks and positions of the contents area on the scan image when in correcting the vertical streaks, correcting the vertical streaks with respect to the overlapping vertical streaks and contents area may be performed by decreasing an intensity of correction regarding the overlapping areas or by excluding the overlapping areas from correction.

The vertical streak correcting method according to an embodiment may be performed by the image scanning apparatus 100, 200 illustrated in FIG. 1 or FIG. 2, or by other image scanning apparatuses having a different constitution.

Further, the vertical streak correcting method according to an embodiment may be implemented using one or more programs including algorithms that can run in a computer, and these one or more programs may be stored and provided on non-transitory computer readable recording medium.

Non-transitory computer readable recording medium indicate medium which store data semi-permanently and can be read by devices, in contrast to a medium storing data temporarily such as register, cache, or memory. By way of example, the above various applications or programs may be stored and provided in non-transitory computer readable recording medium such as a CD, DVD, hard disk, Blu-ray disk, USB, memory card, or ROM.

According to the example embodiments disclosed herein, various predetermined critical ranges, values, lengths, and/or frequencies may be used to determine features including but not limited to whether a pixel is a pole point, whether a pole point is a vertical streak suspected pixel, whether a vertical streak suspected pixel is a vertical streak based upon whether consecutiveness is established, etc. The predetermined critical values and/or ranges which are used to make such determinations may have a different value depending upon the circumstances or may be the same value. For purposes of illustration only, the second sensor may determine first vertical streak suspected pixels as second vertical streak suspected pixels when the second brightness difference and the third brightness difference are less than a predetermined critical value. The third sensor may determine the second vertical streak suspected pixels as third vertical streak suspected pixels when the color ratio between the second vertical streak suspected pixels and the pixels surrounding the second vertical streak suspected pixels is less than a predetermined critical value. Again, by way of example, the predetermined critical value referenced with respect to the second sensor may be the same or different from the predetermined critical value referenced with respect to the third sensor.

Examples of program instructions include both machine code, such as produced by a compiler, and files containing higher level code that may be executed by the computer using an interpreter. The program instructions may be executed by one or more processors. The described hardware devices may act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

According to the example embodiments disclosed herein, vertical streaks generated due to exterior materials may be precisely sensed and corrected on the scan images. Further, when positions of the vertical streaks change according to movement of exterior materials while scanning a document, such vertical streaks may be instantly recognized, sensed and corrected. When the vertical streaks are confirmed on the same position at a plurality of pages constituting the scan images, an alarm message may be provided to a user. Thus, a user can remove the exterior materials.

The image scanning apparatus and methods implemented according to the above-described example embodiments may use one or more processors. For example, a processing device may be implemented using one or more general-purpose or special purpose computers, such as, for example, a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Further, the foregoing exemplary embodiments and advantages are merely exemplary in nature and are not to be construed as limiting the exemplary embodiments. The present teaching can be readily applied to other types of apparatuses. Also, the description of the exemplary embodiments and of the present inventive concept is intended to be illustrative, and not to limit the scope of the claims.

What is claimed is:
1. An image scanning apparatus, comprising:
a scanner to scan a document and generate a scan image;
a sensor to sense pixels in a sensing area on the scan image in a main scan direction having maximum or minimum brightness values as pole points, to sense vertical streak suspected pixels based on at least one of a brightness difference and a color difference between the sensed pole points and pixels surrounding the sensed pole points, and to sense vertical streaks based on a consecutiveness of the vertical streak suspected pixels in a sub scan direction; and
a corrector to correct the sensed vertical streaks on the scan image,
wherein the sensor divides the scan image into a plurality of bands and senses vertical streak suspected pixels per each band.

2. An image scanning apparatus, comprising:
a scanner to scan a document and generate a scan image;
a sensor to sense pixels in a sensing area on the scan image in a main scan direction having maximum or minimum brightness values as pole points, to sense vertical streak suspected pixels based on at least one of a brightness difference and a color difference between the sensed pole points and pixels surrounding the sensed pole points, and to sense vertical streaks based on a consecutiveness of the vertical streak suspected pixels in a sub scan direction; and
a corrector to correct the sensed vertical streaks on the scan image,
wherein the sensor comprises:
a pole point sensor to sense pole points from the pixels disposed in a main scan direction on the scan image;
a first sensor to calculate a first brightness difference between the sensed pole points and pixels surrounding the pole points, and to determine the sensed pole points as first vertical streak suspected pixels when the calculated first brightness difference is within a predetermined critical range;
a second sensor to calculate a second brightness difference between first vertical streak suspected pixels and at least two pixels disposed on a left side of the first vertical streak suspected pixels and to calculate a third brightness difference between the first vertical streak suspected pixels and at least two pixels disposed on a right side of the first vertical streak suspected pixels, and to determine the first vertical streak suspected pixels as second vertical streak suspected pixels when the second brightness difference and the third brightness difference are less than a first predetermined critical value; and
a third sensor to determine the second vertical streak suspected pixels as third vertical streak suspected pixels based on color inclusion and a color ratio between the second vertical streak suspected pixels and pixels surrounding the second vertical streak suspected pixels.

3. The image scanning apparatus of claim 2, wherein the third sensor determines the second vertical streak suspected pixels as third vertical streak suspected pixels when all of the second vertical streak suspected pixels and the pixels surrounding the second vertical streak suspected pixels have color information, and
confirms the color ratio between the second vertical streak suspected pixels and the pixels surrounding the second vertical streak suspected pixels when all of the second vertical streak suspected pixels and the pixels surrounding the second vertical streak suspected pixels do not have color information, and senses the second vertical streak suspected pixels as third vertical streak suspected pixels when the color ratio is less than a second predetermined critical value.

4. The image scanning apparatus of claim 2, wherein the sensor further comprises:
a vertical streak sensor to confirm whether the third vertical streak suspected pixels have consecutiveness in a sub scan direction on the scan image, and to sense the third vertical streak suspected pixels as vertical streaks when at least one of a length and a frequency regarding the consecutiveness is equal to, or greater than, a predetermined critical length or a predetermined critical frequency.

5. The image scanning apparatus of claim 2, further comprising a detector to detect a contents area on the scan image, wherein the corrector protects the detected contents area when it corrects the sensed vertical streaks on the scan image.

6. The image scanning apparatus of claim 5, wherein the detector detects the contents area on the generated scan image by using sensing results of at least one of the first, second, and the third sensors.

7. The image scanning apparatus of claim 6, wherein the detector:
   detects the sensed pole points as corresponding to a contents area when the calculated first brightness difference is greater than a maximum critical value in the predetermined critical range,
   detects the first vertical streak suspected pixels as corresponding to a contents area when the calculated second brightness difference and the calculated third brightness difference are greater than the first predetermined critical value, and
   detects the second vertical streak suspected pixels as corresponding to a contents area when the color ratio is greater than the second predetermined critical value.

8. An image scanning apparatus, comprising:
   a scanner to scan a document and generate a scan image;
   a sensor to sense pixels in a sensing area on the scan image in a main scan direction having maximum or minimum brightness values as pole points, to sense vertical streak suspected pixels based on at least one of a brightness difference and a color difference between the sensed pole points and pixels surrounding the sensed pole points, and to sense vertical streaks based on a consecutiveness of the vertical streak suspected pixels in a sub scan direction;
   a corrector to correct the sensed vertical streaks on the scan image; and
   a detector to detect a contents area on the scan image,
   wherein, when positions of the vertical streaks sensed by the sensor overlap with positions of the contents area detected by the detector, the corrector corrects the vertical streaks by decreasing an intensity of correction regarding the overlapping areas.

9. An image scanning apparatus, comprising:
   a scanner to scan a document and generate a scan image;
   a sensor to sense pixels in a sensing area on the scan image in a main scan direction having maximum or minimum brightness values as pole points, to sense vertical streak suspected pixels based on at least one of a brightness difference and a color difference between the sensed pole points and pixels surrounding the sensed pole points, and to sense vertical streaks based on a consecutiveness of the vertical streak suspected pixels in a sub scan direction;
   a corrector to correct the sensed vertical streaks on the scan image; and
   a detector to detect a contents area on the scan image,
   wherein, when positions of the vertical streaks sensed by the sensor overlap with positions of the contents area detected by the detector, the corrector corrects the vertical streaks by excluding the overlapping areas.

10. The image scanning apparatus of claim 1, wherein, when there is a change in a position of a vertical streak suspected pixel sensed at a starting point of a next band consecutive to a first band based on a first position of a vertical streak suspected pixel sensed in any one band among the plurality of bands, the sensor recognizes the change in position of the vertical streak suspected pixels between the two consecutive bands.

11. The image scanning apparatus of claim 10, wherein the sensor senses positions of the vertical streak suspected pixels for a predetermined number of pixels disposed on left and right sides of the vertical streak suspected pixel corresponding to the first position.

12. The image scanning apparatus of claim 1, further comprising:
   a storage to store positions of the vertical streaks sensed in the scan image.

13. The image scanning apparatus of claim 12, further comprising:
   a message generator to generate an alarm message including vertical streak information due to a presence of exterior materials, when positions of vertical streaks sensed on at least two consecutive pages included in the scan image are substantially uniform; and
   a user interface to output the alarm message.

14. A vertical streak correcting method of an image scanning apparatus, comprising:
   scanning a document and generating a scan image;
   sensing pixels in a sensing area on the scan image in a main scan direction having maximum or minimum brightness values as pole points; sensing vertical streak suspected pixels based on at least one of a brightness difference and a color difference between the sensed pole points and pixels surrounding the pole points;
   sensing vertical streaks based on a consecutiveness of the vertical streak suspected pixels in a sub scan direction; and
   correcting the sensed vertical streaks on the scan image,
   wherein the sensing vertical streaks comprises dividing the scan image into a plurality of bands and sensing the vertical streak suspected pixels per each band.

15. A vertical streak correcting method of an image scanning apparatus, comprising:
   scanning a document and generating a scan image;
   sensing pixels in a sensing area on the scan image in a main scan direction having maximum or minimum brightness values as pole points;
   sensing vertical streak suspected pixels based on at least one of a brightness difference and a color difference between the sensed pole points and pixels surrounding the pole points;
   sensing vertical streaks based on a consecutiveness of the vertical streak suspected pixels in a sub scan direction; and
   correcting the sensed vertical streaks on the scan image,
   wherein the sensing vertical streak suspected pixels comprises:
   calculating a first brightness difference between the sensed pole points and pixels surrounding the pole points, and determining the sensed pole points as first vertical streak suspected pixels when the calculated first brightness difference is within a predetermined critical range;
   calculating a second brightness difference between the first vertical streak suspected pixels and at least two pixels disposed on a left side of the first vertical streak suspected pixels and calculating a third brightness difference between the first vertical streak suspected pixels and at least two pixels disposed on a right side of the first vertical streak suspected pixels, and determining the first vertical streak suspected pixels as second vertical streak suspected pixels when the first brightness difference and the second brightness difference are less than a first predetermined critical value; and
   determining the second vertical streak suspected pixels as third vertical streak suspected pixels based on color inclusion and a color ratio between the second vertical streak suspected pixels and pixels surrounding the second vertical streak suspected pixels.

16. The vertical streak correcting method of claim 15, wherein the determining the second vertical streak suspected pixels as third vertical streak suspected pixels comprises:
   determining the second vertical streak suspected pixels as third vertical streak suspected pixels when all of the second vertical streak suspected pixels and the pixels surrounding the second vertical streak suspected pixels have color information, and
   determining a color ratio between the second vertical streak suspected pixels and the pixels surrounding the second vertical streak suspected pixels, when all of the second vertical streak suspected pixels and the pixels surrounding the second vertical streak suspected pixels do not have color information, and
   when the color ratio is less than a second predetermined critical value, determining the second vertical streak suspected pixels as third vertical streak suspected pixels.

17. The vertical streak correcting method of claim 15, wherein the sensing vertical streaks further comprises:
   confirming whether the third vertical streak suspected pixels have consecutiveness in a sub scan direction on the scan image, and when at least one of a length and a frequency regarding the consecutiveness is equal to, or greater than a predetermined critical length or a predetermined critical frequency, sensing the third vertical streak suspected pixels as vertical streaks.

18. The vertical streak correcting method of claim 15, further comprising detecting a contents area on the scan image, wherein the correcting further comprises protecting the detected contents area when the sensed vertical streaks on the scan image are corrected.

19. The vertical streak correcting method of claim 18, wherein the detecting the contents area on the scan image further comprises:
   detecting the sensed pole points as corresponding to a contents area, when the first brightness difference is greater than a maximum critical value in the predetermined critical range;
   detecting the first vertical streak suspected pixels as corresponding to a contents area, when the second brightness difference and the third brightness difference are greater than the first predetermined critical value; and
   detecting the second vertical streak suspected pixels as corresponding to a contents area, when the color ratio is greater than the second predetermined critical value.

20. The vertical streak correcting method of claim 14, wherein the sensing vertical streaks further comprises:
   when there is a change in a position of a vertical streak suspected pixel sensed at a starting point of a next band consecutive to a first band based on a first position of a vertical streak suspected pixel sensed in any one band among the plurality of bands, recognizing the change in position of the vertical streak suspected pixels between two consecutive bands; and
   sensing positions of the vertical streak suspected pixels for a predetermined number of pixels disposed on left and right sides of the vertical streak suspected pixel corresponding to the first position.

21. The vertical streak correcting method of claim 14, further comprising:
   storing positions of the vertical streaks sensed on the scan image;
   generating an alarm message including vertical streak information due to a presence of exterior materials, when positions of the vertical streaks sensed on at least two consecutive pages included in the scan image are substantially uniform; and
   outputting the alarm message.

22. A non-transitory computer-readable recording medium to record at least one program, that when executed, implements the vertical streak correcting method of claim 14.

23. An image scanning apparatus, comprising:
   a scanner to scan a document and generate a scan image;
   a sensor to sense pixels in a sensing area on the scan image in a main scan direction having maximum or minimum brightness values as pole points, to sense vertical streak suspected pixels by comparing the sensed pole points with pixels surrounding the sensed pole points, and to sense vertical streaks based on characteristics of the vertical streak suspected pixels;
   a detector to detect a contents area on the scan image; and
   a corrector to correct the sensed vertical streaks on the scan image according to whether the sensed vertical streaks overlap with the detected contents area,
   wherein the sensor divides the scan image into a plurality of bands and senses vertical streak suspected pixels per each band.

\* \* \* \* \*